Aug. 27, 1968 R. M. HALVORSEN 3,398,999
LINEAR MOTION BALL BEARING ASSEMBLY
Filed Aug. 15, 1966 4 Sheets-Sheet 1

INVENTOR
ROBERT M. HALVORSEN
BY
James H. Bowen
ATTORNEY

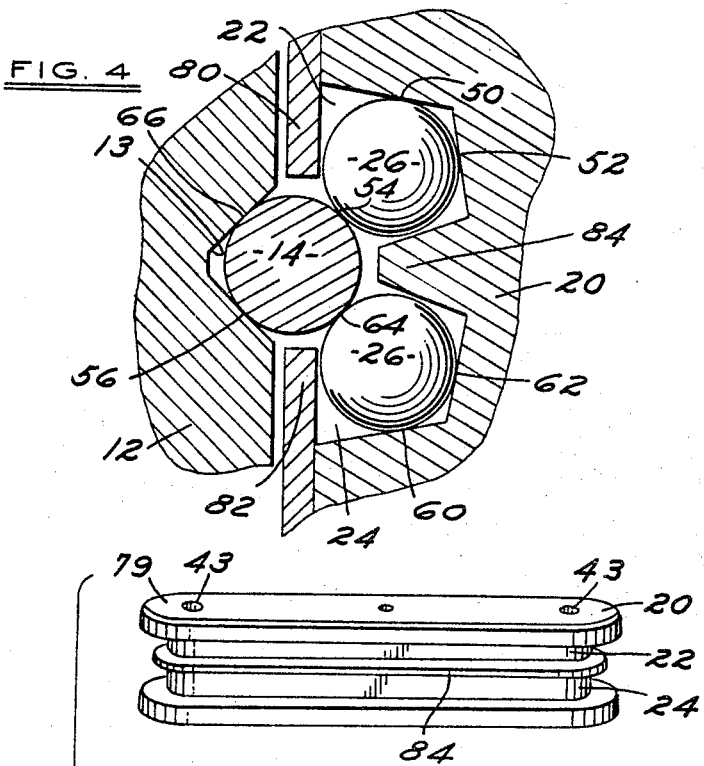
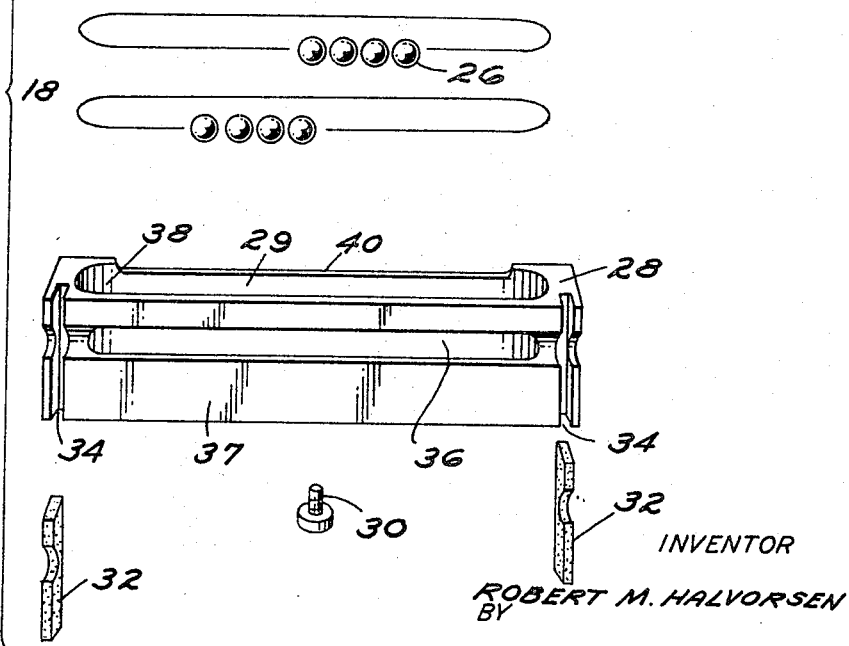

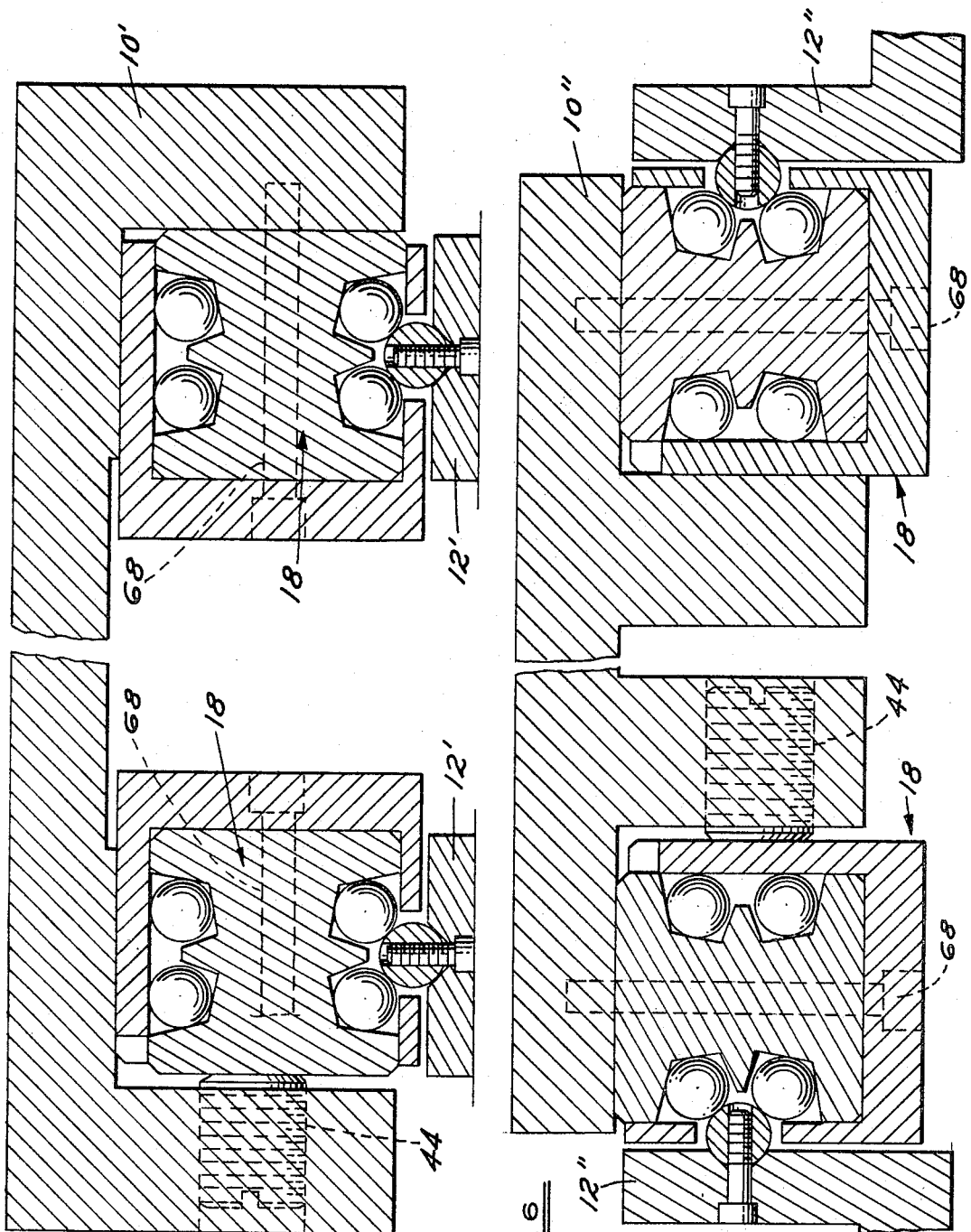

Aug. 27, 1968    R. M. HALVORSEN    3,398,999
LINEAR MOTION BALL BEARING ASSEMBLY
Filed Aug. 15, 1966    4 Sheets-Sheet 4
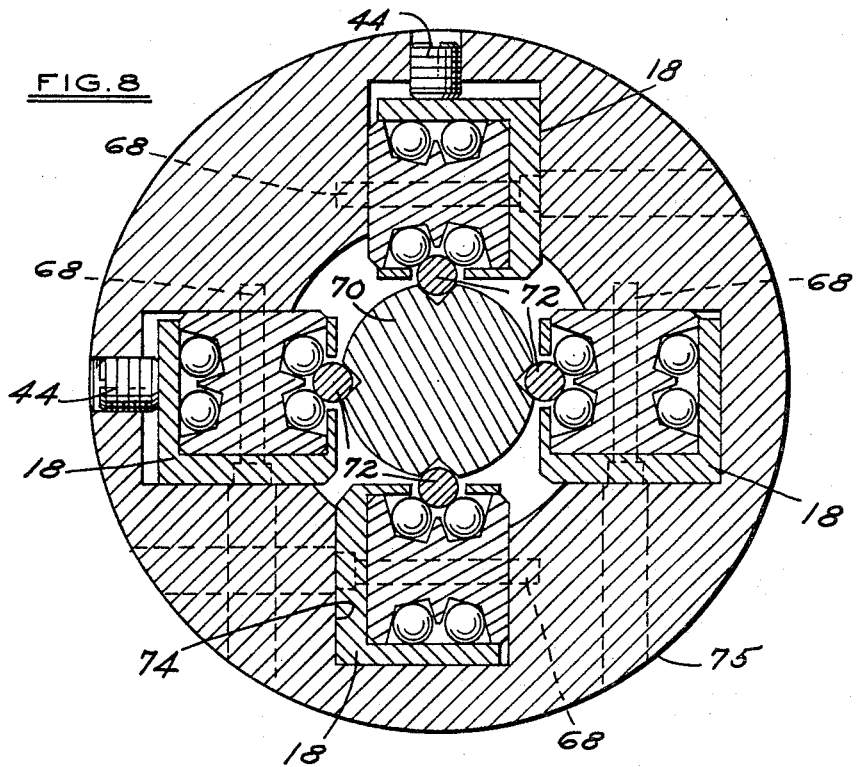
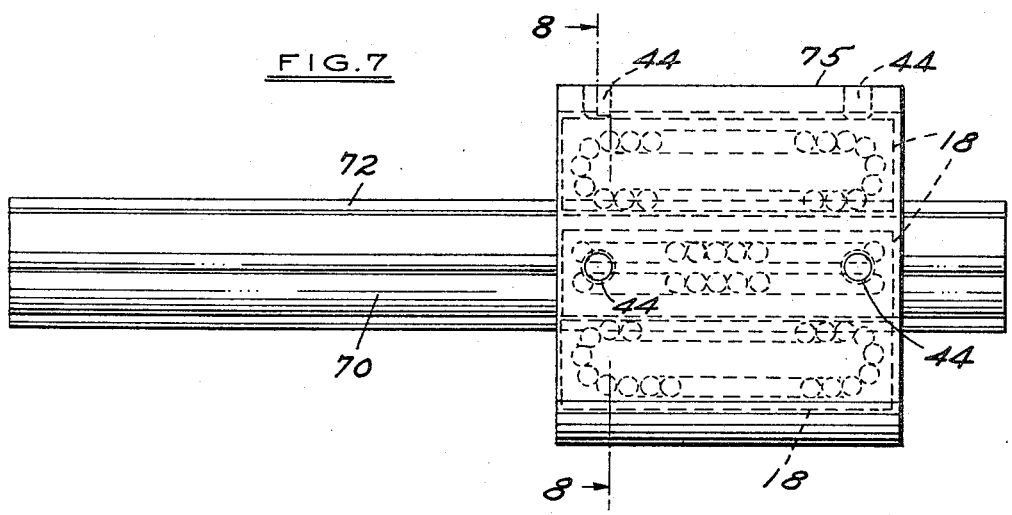
INVENTOR
ROBERT M. HALVORSEN
BY
James H. Bower
ATTORNEY United States Patent Office 3,398,999
Patented Aug. 27, 1968

3,398,999
LINEAR MOTION BALL BEARING ASSEMBLY
Robert M. Halvorsen, Allen Park, Mich., assignor to
Ex-Cell-O Corporation
Filed Aug. 15, 1966, Ser. No. 572,300
11 Claims. (Cl. 308—6)

ABSTRACT OF THE DISCLOSURE

A linear motion apparatus having a unitary ball bearing module. The module includes a ball bearing block with a pair of endless path raceways and ball bearings in said raceways adapted for recirculating movement. The retaining means has a top opening for insertion of the bearing block and further includes a frontal wall slotted opening adapted to provide contact of said ball bearings on a track rod.

---

This invention has reference to improvements in and relating to anti-friction linear motion obtained with recirculating ball bearing assemblies.

Linear motion recirculating ball bearings heretofore provided have been of inferior design and provided relatively poor performance. The present invention provides means for guiding the balls in a desired path and also provides a retaining means which assures spacing of the balls to obtain proper load distribution, and furthermore to effect the desired movement of the balls within the bearing module. The bearing construction is applicable to any mechanism involving linear motion between parts.

It is accordingly an important object of the invention to provide a recirculating ball bearing construction having accurate, dependable and almost frictionless straight line motion.

Another object is the provision of a recirculating ball bearing assembly in which positive guidance is provided for the balls throughout their path of travel.

Another object is the provision of a return trackway or closed loop to provide a continuous path for the balls.

Another object is the provision of a bearing construction of the type indicated in which the balls are maintained in spaced relation to achieve uniform load distribution.

Another object is the provision of a recirculating ball bearing construction facilitating precision manufacture and assembly of the structure.

Other and further objects, advantages, and features of the invention will become apparent to those skilled in the art from the following detailed description, taken in conjunction with the accompanying drawings, in which:

FIGURE 3 is a perspective exploded view of the preferred embodiment of the invention;

FIGURE 4 is a cross-sectional enlarged fragmentary view taken along line 4—4 in FIGURE 1;

FIGURE 5 is a transverse sectional view of a modified embodiment of the invention;

FIGURE 6 is a transverse sectional view of another modified embodiment of the invention;

FIGURE 7 is a plan view of another embodiment of this invention; and

FIGURE 8 is a transverse sectional view of FIGURE 7.

Figure 1:
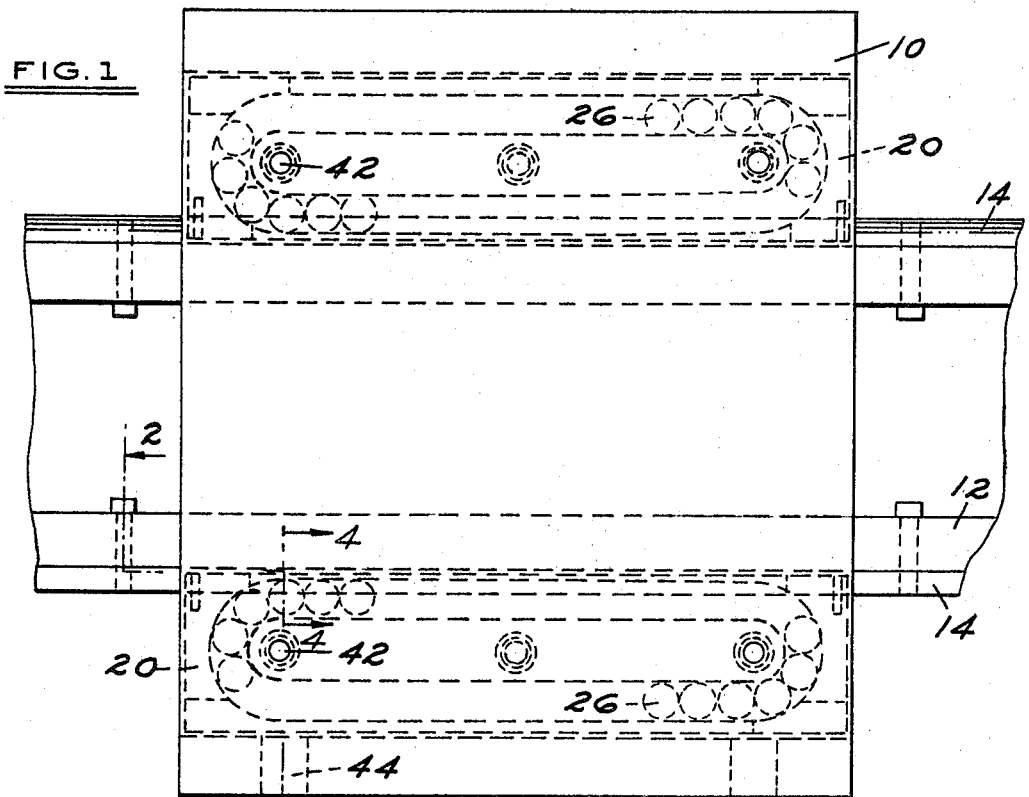
FIGURE 1 is a plan view of the preferred embodiment of the invention.
Figure 2:
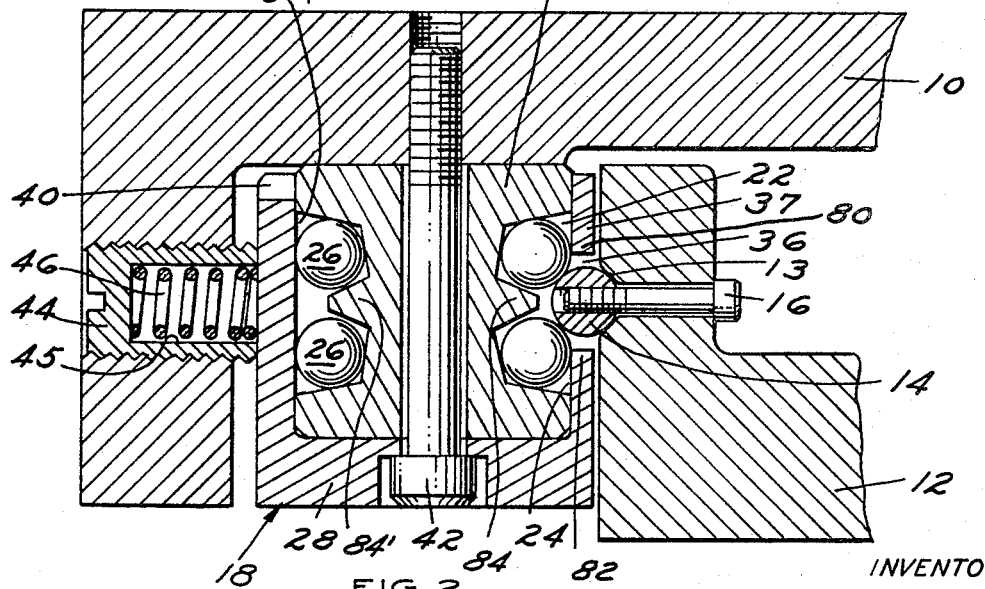
FIGURE 2 is a cross-sectional view taken substantially as indicated by the line 2—2 in FIGURE 1.

Referring to the drawings and FIGURES 1–4 inclusive, there is shown a carriage 10 adapted for longitudinal movement on a rail 12 of indeterminate length. The movement of the carriage 10 on the rail 12 is aided by means of a track rod 14 mounted in a recess 13 of the rail 12 by means of track rod retaining screws 16. The linear recirculating ball bearing module 18 consists of a ball race or block 20 having upper and lower channels or raceways 22 and 24 respectively which extend around the ball race 20 to form an endless path, as shown in FIGURES 2 and 3. Balls 26 are adapted for movement within the channels or raceways 22 and 24 respectively in a manner to be hereinafter described. The balls 26 are contained in the raceways 22 and 24 of the ball race or block 20 by means of a retaining means 28. The module when assembled is fastened and held together by means of a retaining screw 30. The module 18 is a fully assembled unit that provides positive ball retention by means of its self-contained module design, and includes a continuous path for the balls. This results in simpler storage and handling by means of its simple unitary construction.

The linear recirculating ball bearing module 18 contains a wiper or scraper 32 which is inserted into a slot or recess 34 of the retainer 28. The wiper or scraper 32 can be of any material or composition for the purpose of wiping any contaminant that may occur on the track rod 14. This then results in a clean metal to metal contact between the balls 26 and the track rod 14, as shown in FIGURES 2, 3 and 4. Contact between the balls 26 and the track rod 14 is provided by milling the retaining means 28 in a well known manner to thus provide an opening or slot 36 on the frontal wall 37 of the retaining means 28. The width of opening 36 is not less than the diameter of a ball and not greater than twice the diameter and when fully assembled by means of its construction prevents balls 26 from dropping out in a manner to be herein described. The opening 36 provides an upper abutting edge 80 and a lower abutting edge 82 on the frontal wall 37 of the retaining means 28.

To maintain balls 26 in their respective raceways lobe 84 extends around the ball race 20 medially between raceways 22 and 24. The purpose of the lobe 84 is to prevent the balls from falling out of the open front, that is, the opening between the lobe 84 and 80 or 82 is smaller than the diameter of each ball. Furthermore the lobe extends around the recirculating side to entrap the balls, such as shown in FIGURE 2, wherein lobe 84' maintains the balls 26 recirculating against the back wall 38 of the retaining means 28. The configuration of the race and raceway, and the retaining means are designed within certain limits to achieve proper operation and performance. It is of importance to note that the clearance around the ball in the recirculating raceway be controlled to prevent any "collet action." "Collet action" is a term that defines a condition that exists when the balls attempts to climb up or ride up on top of each other during recirculation. Therefore, it is important that while the balls in the front portion of the module are pre-loaded on the track rod so as to transmit forces from the table through balls to the track rod and thence through the track rod to the rail, the recirculating side, that is, the side opposite the front maintains no stress or force relationships on the balls and the balls therefore are able to recirculate in a free manner.

The back wall 38 of retaining means 28 includes a recess 40 to provide insertion of the balls 26 during assembly, that is, the ball race 20 is partly inserted into a top opening 29 of the retaining means 28 and the balls 26 are dropped into raceway of the ball race through the recess 40. As the raceway is accommodated with its full complement of balls 26 the ball race is further inserted into the opening 29 and the second raceway is filled with balls through the frontal opening 36. The retaining screw 30 securely fastens the ball race 20 to the retainer 28, when the ball race is fully seated in the opening 29.

The module 18 is assembled to the carriage 10 by means of a screw 42 which extends through bore 43 of ball race 20. To provide for proper adjustment and positioning of the module 18 to the rail or base 12 a pre-load and back-up screw 44 is provided therefor. The pre-load and back-up screw 44 includes a spring 46 inserted in a recess 45 of screw 44 which provides a force on the module 18 against the track rod 14, as shown in FIGURE 2.

The contact force between the balls 26 and the track rod 14 is controlled by the pre-load and back-up screw 44. This pre-load is critical since the force or load is transmitted from the carriage 10 through the balls 26 to the track rod 14 at points of contact in a manner shown in the magnified view in FIGURE 4. That is, the forces transmitted occur in a manner that prevents distortion and results in an increased unit load capacity. As shown in FIGURE 4, the contact of a ball in the upper raceway 22 at points 50 and 52 transmits the forces to the track rod 14 at point 54. The track rod 14 being secured in the recess 13 of the rail or base 12 thus transmits the forces to the rail or base 12 at a point 56 without undue distortion or stress. Similarly, the balls 26 in the lower raceway 24, by nature of the pre-load hereinbefore disclosed, transmits its forces through points 60 and 62 to the track rod at point 64 and thence to the rail or base 12 at a point 66. Thus it can be readily apparent that the forces are transmitted from the carriage 10 through the recirculating balls, and through the track rod 14 to the rail or base 12. As shown in FIGURES 1 and 2 the load forces are transmitted on one side of the linear recirculating ball bearing module 18, and the balls 26 are adapted to be recirculated on the opposite side of the module when the carriage 10 is moved linearly with respect to the rail 12. The balls 26 are adapted to recirculating travel in raceways 22 and 24, however, it is well within the scope of obviousness that the balls 26 need not recirculate under limited travel linear movement of the carriage with respect to the rail. That is, this unit can be adapted for non-recirculating travel of balls 26.

The track for the balls to roll on can either be round or square. That is, with the square track the flat surfaces are at an angle placing one flat surface to each layer of balls and with the apex or the junction of the two surfaces between the paths of the balls, the apex being adjacent the lobe 84. It is further apparent that the track rod may not only be round or square, but also be integral with the rail or detachably connected to it. Moreover, it would be obvious that the track may be designed of some special configuration that would increase load capacity.

The importance of having the track rod as a separate detachable piece is that if wear occurs on one surface of the track rod, it may be turned over end-for-end, or rotated on its axis to provide a new surface path for the balls. In other words, the complete assembly may be placed in an approximately new condition by proper positioning or adjustment of the track rod. Moreover, another feature of providing a track rod as a separate piece is that the rail can be made of any material without affecting the performance of the bearing assembly.

Another important aspect of this invention is in the construction of the ball race. Since the load forces are primarily transmitted between the balls and the track rod, the balls are not under load when they go around the radius portion 79 of the ball race. That is, the radius portion of the ball race is only for movement of the balls and therefore it does not receive any wear or stress as the result of load forces. Consequently, the radius portion on the ball race may vary in two aspects without affecting the bearing performance. The material on the radius portion may be of a different composition or of a different material and the radius dimension may vary and still allow easy and stress free diversion of the balls.

Furthermore, the balls are not under load forces when they are on the recirculating side of the ball race, that is, opposite the side of the track rod. Thus the ball raceways do not wear on the recirculating side as on the load or front side of the module, and as in the case of the track rod, the ball race is similarly adapted to be rotated 180 degrees or turned over end-for-end when wear occurs on the front or loaded raceways. This provides for one single module to be restored with a minimum of effort and expense, in that: (1) the ball race is positionable; and for the combination with a track rod, (2) the track rod is positionable. The manipulation of both the track rod and the ball race combination affords complete restoration of an item to its original or approximately original state.

As shown in FIGURES 2 and 4, the raceways are provided with surfaces that are at an angle with respect to each other, however, it is well within the scope of this invention that the surfaces can be normal to each other. Furthermore, the surfaces of the recess 13 can be any angle depending on the diameter of the track rod and the angle created by the raceways.

While FIGURES 1 and 2 show the preferred embodiment, FIGURES 5 and 6 show modifications thereof. The conventional module 18, hereinbefore disclosed, is mounted in a manner shown in FIGURE 5 in which the preloading is provided by the weight of the table or carriage 10'. The screw 44 is used for alinement and back-up. The linear recirculating ball bearing module 18 is secured to the carriage 10' by means of any conventional manner, such as, e.g., screws 68. Each of the modules is mounted on a rail 12' by means of track rod 14 in a manner hereinbefore disclosed. It is apparent that the modification shown in FIGURE 5 is adapted for long or short slideways, such as machine tool slideways and others, because the weight of the table or carriage 10' applies the preload to the module.

FIGURE 6 shows a further modification in that the carriage 10 is mounted for movement centrally of the rail 12". This modification though is similar to the preferred embodiment in that the module 18 is adjusted for preload by screw 44, in a manner hereinbefore disclosed.

A further modification is shown in FIGURES 7 and 8, wherein a rod 70 is provided with track rods 72 secured thereto in a conventional manner. The linear recirculating ball bearing module 18 is inserted in recesses 74 of cylinder carriage 75. The recesses 74 are diametrically opposite each other, and the modules 18 are preloaded by screws 44 in a manner hereinbefore disclosed. It is to be noted that in cases where the modules are opposite each other, only one preload and back-up screw is needed to provide the necessary preload. However, in cases of an odd number of modules or where the modules are not opposite each other but angularly offset each of the modules would be provided with its own preload and back-up screw for the reason hereinbefore disclosed.

Thus, the invention provides a simple slide module which is made of a minimum number of parts but ensures the accurate holding of a movable carriage or other machine part with a minimum of friction. The arrangement is such that adjustment may be made to preload the movable element in a selected direction thus providing for unhindered linear displacement. The module is maintained in a substantially closed housing for positive ball bearing retention and continuous ball recirculation. Any wear may be compensated for by simple adjustment of the preload and back-up screw.

While specific embodiments of the invention have been shown and described in detail to illustrate the application of the inventive principles, it will be understood that the invention may be embodied otherwise without departing from such concepts and principles hereinabove disclosed.

What is claimed is:

1. A unitary ball bearing module comprising:
   (a) a unitary ball bearing block having a pair of longitudinally extending parallel endless path raceways;

(b) a purality of balls in each of said pair of raceways adapted for endless recirculating movement;

(c) a unitary retainer means for retaining said ball bearing block and said balls, said retainer means having a top opening and including:
  (1) a bottom wall;
  (2) two end walls;
  (3) a back wall; and
  (4) a frontal wall, said frontal wall having a unitary opening extending substantially the length of said frontal wall;

(d) and means for securing said block to said retaining means.

2. The invention as defined in claim 1 further comprising:
(a) said block including a plurality of parallel raceways wherein each of said raceways is shaped to define a continuous endless channel of substantially uniform width and depth extending longitudinally around said block; and
(b) said opening on said frontal side of said retaining means extending longitudinally to provide external contact of said balls whereby said balls are adapted for recirculating in each of said endless channels.

3. The invention as defined in claim 1, further comprising:
(a) said retainer means having a recess adjacent said top opening and extending longitudinally along said back wall whereby insertion of said balls is facilitated during assembly of said module.

4. The invention as defined in claim 2, further comprising:
(a) the width of said opening extending longitudinally along one side of said retainer means is not less than the diameter of each of said balls and not greater than twice the diameter of each of said balls.

5. The invention as defined in claim 2, further comprising:
(a) a slot at each end of said retainer means and extending normal to said longitudinal opening; and
(b) a wiping means inserted in each of said slots.

6. The invention as defined in claim 2, further comprising in combination:
(a) a base;
(b) track rod means detachably fastened on said base;
(c) a carriage means;
(d) said module detachably fastened to said carriage means;
(e) a plurality of balls in each of said raceways to form a pair of parallel endless paths of said balls; and
(f) said track rod means being disposed between said pair of parallel endless paths of said balls; whereby said plurality of balls constitute lateral supports between said carriage means and said track rod means on said base, and relative movement between said carriage means and said base is provided by said balls forming an endless path in said raceways to continuously circulate upon relative movement between said carriage means and said base.

7. The invention as defined in claim 5, further comprising in combination:
(a) a base;
(b) a track rod on said base;
(c) a carriage means;
(d) said module fastened to said carriage means, whereby said track rod is disposed between at least a pair of recirculating balls and wherein said balls constitute lateral supports between said carriage and said base.

8. The invention as defined in claim 6, further comprising:
(a) means for adjusting said module on said track rod of said base.

9. The invention as defined in claim 6, further comprising:
(a) means for adjusting said module to said track of said base, to provide a preload therefor.

10. The invention as defined in claim 2, further comprising in combination:
(a) a cylindrical rod;
(b) a plurality of track rods attached to said cylindrical rod;
(c) a cylindrical housing means having a plurality of recesses facing inwardly toward said cylindrical rod, each of said recesses facing each of said track rods, respectively;
(d) a plurality of said modules attached to said cylindrical housing and seated in each of said recesses, respectively; and
(e) adjustment means on said cylindrical housing to bias said module on said track rod.

11. The invention as defined in claim 1, wherein:
(a) said unitary ball bearing block includes two longitudinally extending side portions and two radius portions, each of said radius portions being substantially semi-circular in shape.

References Cited

UNITED STATES PATENTS

| | | | |
|---|---|---|---|
| 560,322 | 5/1896 | McGloin | 308—185 X |
| 710,609 | 10/1902 | Pungs | 308—185 X |
| 1,075,829 | 10/1913 | Knipe | 308—198 |
| 2,655,415 | 10/1953 | Briney | 308—6 |
| 2,929,661 | 3/1960 | Brown | 308—6 |
| 2,945,366 | 7/1960 | Sears | 308—6 |
| 3,008,774 | 11/1961 | Morris et al. | 308—6 X |
| 3,044,835 | 7/1962 | Hurd | 308—6 |
| 3,190,703 | 6/1965 | Thomson et al. | 308—6 |

FOREIGN PATENTS 211,992  3/1924  Great Britain.

MARTIN P. SCHWADRON, *Primary Examiner.*

CARROLL B. DORITY, *Assistant Examiner.*